Patented Sept. 12, 1933

1,926,322

UNITED STATES PATENT OFFICE

1,926,322

FIXING OF IMAGES OBTAINED BY A NEGATIVE DIAZOTYPE PROCESS

Karel Jan Joseph van der Grinten and Lodewijk Pieter Frans van der Grinten, Venlo, Netherlands, assignors to N. V. Chemische Fabriek L. van der Grinten, Venlo, Netherlands, a Dutch company of the Netherlands No Drawing. Application December 27, 1930, Serial No. 505,204, and in the Netherlands January 6, 1930

10 Claims. (Cl. 95—88)

Negative diazotype processes produce images for phototype and photographic purposes which contain dyestuff in the parts which have been exposed to light. These parts are also fixed because the exposure to light results in a permanent final condition. The non-exposed parts remain in the original condition and the materials sensitive to light, capable of forming dyestuffs, have hitherto been removed from these parts by washing, in order to fix the contrast of these parts with the exposed parts containing dyestuff.

This washing is cumbersome and prolongs the process, the more so as the images have to be dried afterwards.

It has now been found that images obtained by a negative diazotype process may be fixed by the mere addition of an agent acting on the material in the non-exposed parts, in such manner that the power of forming a dyestuff is lost. The addition of such agent may be carried out advantageously by applying a thin quickly drying layer of a solution containing such agent, which may be effected very quickly and simply, for instance with the apparatus described in U. S. Patents 1,841,653 or 1,821,306.

The agent added must be suitable for the particular process by which the image is obtained. It may act in different ways, for instance it may react with the diazo-compound to form products which are not sensitive to light and/or which are no longer capable of forming a dyestuff; or it may react with the dyestuff components already present or formed by subsequent exposure to light, so that they loose the property of forming a dyestuff. In many cases it can hardly be stated on which reaction the fixing action of a definite agent in a definite case is based.

For the purpose of the application it is not necessary that total fixation be obtained exclusively by the added agent. For instance the light sensitive and colour forming compounds may be left chemically unchanged by the added agent and retain their original properties, provided that the conditions in the light sensitive layer are changed by the addition that by further exposure to light no more dyestuff is formed. Thus it is possible by changing the medium, for instance from alkaline or neutral to acid or from alkaline to neutral, to prevent the formation of dyestuff by further exposure to light without impairing the light-sensitiveness of the diazo-compounds or the property of coupling of the azo dyestuff components. In this case the layer is still changed by further exposure to light after the fixation, but no dyestuff is formed.

It is also possible to combine these methods, so that a chemical change is obtained in the light sensitive and colour forming constituents and also a change in the conditions controlling the formation of dyestuff. Besides preventing the formation of dyestuff by fixing, it may be important to protect the layer against the discoloration of the substances which, though no longer capable of forming dyestuff, may become yellow in the course of time. To this end it may be advantageous to introduce, in addition to the fixing agents, substances which prevent the back ground from becoming yellow, as described in U. S. Patent 1,821,821.

These anti-yellowing substances may also be present in the light sensitive layers before fixation. The fixing agents used may be at the same time anti-yellowing agents, but in this case they cannot be introduced into the sensitive layer before exposure. It is also possible for the constituents of the layer to react in such a manner that they produce an anti-yellowing agent. Generally speaking, the process according to the invention may be combined with any known processes which are capable of improving the images, such as the addition of substances improving the fastness to light or water, the sizing, etc.

In some cases the successive addition of several fixing agents may be desirable, and notwithstanding this complication the process may still be more advantageous than washing.

It is obvious that images of different colours may be obtained, according to the light-sensitive layers used. The colour of the images, however, may also be influenced by additions to the fixing agent, because this agent is also introduced into the exposed parts where dyestuffs has been formed. The fixing agent, however, should not detrimentally affect the formed dyestuff. In some cases the fixing agent may be a volatile substance. In these cases the fixation may be carried out in the dry way merely by exposing the print to the action of the vapour or the fixing agent.

The following examples illustrate the invention:

*Example 1.*—Paper prepared with a 2% aqueous solution of 3. diazo-indazol in a neutral or weakly acid medium is exposed to light through a transparent original. A negative image is obtained when using a positive original, and a positive image when using a negative original.

The image is fixed by the application of a thin layer of a fixing agent, consisting of a 5% solution of stannous chloride or a diluted acid or a weak alkaline 5% solution of hydrazine sulphate. The application may be effected in the manner described in U. S. Patent 1,841,653, preferably with the apparatus, described in U. S. Patent 1,821,306.

The fixation may also be carried out in the dry way by exposure to the vapours of hydrochloric acid or other volatile acid. Durable images in yellow brown to dark brown colours are obtained.

Example 2.—Paper is prepared with a 3% weakly acid or neutral solution of o-diazo-p-chlorophenol and is exposed to light through a transparent original. Negative images are obtained from positive originals. The image is fixed by applying a thin layer of a fixing agent consisting of a 5% solution of stannous chloride or a dilute acid. The application may be effected as in Example 1. Fixation may also be obtained by a dry treatment with vaporised hydrochloric acid or other volatile acid. The images obtained are yellow brown to dark brown.

Example 3.—The paper is prepared with a 2% aqueous solution of 1-diazo-2-oxy-naphthalene-4-sulphonic acid, and 5% sodium carbonate. It is exposed to light through a transparent original. A negative image is obtained from a positive original. Before fixation the image is dark blue violet. By fixation with a liquid containing 5% thio-urea or 5% sodium bisulphite, the image is fixed in the same colour and is durable. By fixation with dilute solutions of acids, such as citric acid, oxalic acid and tartaric acid, a durable brown yellow image is obtained. The application of the fixing agent is carried out as in Example 1.

Example 4.—A paper prepared with a neutral or weakly acid solution containing 2% 3-diazo-indazol and 2% o-diazo-p-nitro-phenol, is exposed through a transparent original. A negative image is obtained from a positive original. The image is fixed by applying a thin layer as described in Example 1 of a fixing agent consisting of an aqueous solution of chromium compounds or sulphides or ferrous sulphate. By fixation with these solutions the image obtained has different colours according to the fixing agent used. By fixation with a 5% sodium hydrosulphite solution the non-exposed parts become yellow, but are decolorized by the further exposure to light which takes place in practice. The images obtained are dark blue.

Example 5.—A paper prepared with a solution containing 2% p-diazo-diphenylamine, 12% sodium bisulphite, 5% sodium carbonate, 0.6% phloroglucinol and 0.6% resorcinol is exposed through a transparent original. As in Example 1, negative images are obtained from positive originals. After exposure a dark red brown image is obtained. The image is fixed by applying a thin layer of a fixing agent in the manner described in Example 1.

By fixing with a 5% weakly alkaline solution of hydrazine, or with a solution of sodium hydrosulphite or of hydroxylamine, red brown images are obtained. By fixation with organic acids, such as tartaric acid and citric acid, a brown image is obtained. By fixing with dilute mineral acids, such as hydrochloric acid or sulphuric acid, or with a strong organic acid, such as oxalic acid, an intense black image is obtained.

The layer may also be fixed with vapours of hydrochloric acid. The non-exposed parts are still yellow after fixation, but are decolorised by the prolonged action of light which takes place in practice.

Example 6.—Paper prepared with a solution of: 2% p.diazo-diethylaniline, 10% sodium bisulfite, 5% sodium carbonate, and 0.6% phloroglucinol is exposed to light under a transparent original.

Negative images are obtained from positive originals.

The image may be fixed by applying a 5% solution of stannous chloride. A dark brown image is obtained. The non-exposed parts are still yellow after the fixation, but are decolorised by the prolonged action of light.

What we claim is:—

1. The process for fixing those portions of the image obtained by a negative diazo type process composed of the unexposed material of the sensitive layer which comprises introducing into said portions an acidic substance in such amount as to render the existing medium of said material sufficiently acid as to prevent said material from forming a dyestuff upon subsequent exposure to light.

2. The process for fixing those portions of the image obtained by a negative diazo type process composed of the unexposed material of the sensitive layer which comprises introducing into said portions an acidic substance, and a substance capable of reacting with any of the components of said material to form a reaction product which with any of said components is incapable of forming a dyestuff in the presence of said acidic substance upon subsequent exposure to light.

3. The process for fixing those portions of the image obtained by a negative diazo type process composed of the unexposed material of the sensitive layer including a diazo compound as one of its components which comprises introducing into said portions an agent capable of reducing said diazo compound to a compound which with any component of the sensitive layer is incapable of forming a dyestuff upon subsequent exposure to light.

4. The process for fixing those portions of the image obtained by a negative diazo type process composed of the unexposed material of the sensitive layer including a diazo compound as one of its components which comprises introducing into said portions an acidic substance, and an agent capable of reducing said diazo compound to a compound which with any component of the sensitive layer is incapable of forming a dyestuff in the presence of said acidic substance upon subsequent exposure to light.

5. The process for fixing those portions of the image obtained by a negative diazo type process composed of the unexposed components of the sensitive layer including a diazosulphonate as one of said components which comprises introducing into said portions an acidic substance in such amount that said diazosulphonate is incapable of forming a dyestuff with any other of said components upon subsequent exposure to light.

6. The process for fixing those portions of the image obtained by a negative diazo type process composed of the unexposed components of the sensitive layer including a diazosulphonate as one of said components which comprises introducing into said portions an agent capable of reducing said diazosulphonate to a compound which with any of said components is incapable of forming a dyestuff upon subsequent exposure to light.

7. The process for fixing those portions of the image obtained by a negative diazo type process composed of the unexposed components of the sensitive layer including a diazosulphonate as one of said components which comprises introducing into said portions an acidic substance, and an agent capable of reducing said diazosulphonate to a compound which with any other of said components is incapable of forming a dyestuff in the presence of said acidic substance upon subsequent exposure to light.

8. The process for fixing those portions of the image obtained by a negative diazo type process composed of the unexposed material of the sensitive layer which comprises introducing into said portions an agent capable of rendering said material incapable of forming a dyestuff upon subsequent exposure to light, and a reducing agent modifying the background of the image.

9. The process for fixing those portions of the image obtained by a negative diazotype process composed of the unexposed material of the sensitive layer which comprises introducing into said portions a reducing agent in such amount as to render said material incapable of forming a dyestuff upon subsequent exposure to light.

10. The process for fixing those portions of the image obtained by a negative diazotype process composed of the unexposed material of the sensitive layer, including a diazo compound as one of its components, which comprises introducing into said portions an acidic substance in such amount that the diazo compound is incapable of forming a dyestuff with any component of the sensitive layer in the presence of said acidic substance upon subsequent exposure to light.

KAREL JAN JOSEPH van der GRINTEN.
LODEWIJK PIETER FRANS
                  van der GRINTEN.